US005500125A

United States Patent [19]

Horn et al.

[11] Patent Number: 5,500,125

[45] Date of Patent: Mar. 19, 1996

[54] PROCESS FOR RECYCLING PHOTOGRAPHIC WASH WATER

[75] Inventors: Richard R. Horn, Fairport; Christine K. Gaskell, Rochester; Susan R. Krauss, Pittsford; Michael D. Purol, Rochester, all of N.Y.

[73] Assignee: Eastman Kodak Company, Rochester, N.Y.

[21] Appl. No.: 245,797

[22] Filed: May 19, 1994

[51] Int. Cl.[6] .......... C02F 9/00

[52] U.S. Cl. .......... 210/668; 210/669; 210/684; 210/694; 210/912; 210/917

[58] Field of Search .......... 210/662, 668, 210/669, 684, 694, 753, 758, 759, 760, 912, 917

[56] References Cited

U.S. PATENT DOCUMENTS

| | | | |
|---|---|---|---|
| 4,632,763 | 12/1986 | Wernicke et al. | 210/670 |
| 4,637,865 | 1/1987 | Sergent et al. | 204/111 |
| 5,133,846 | 7/1992 | De Niel et al. | 210/284 |

FOREIGN PATENT DOCUMENTS 1092-743-A 10/1987 Japan .

OTHER PUBLICATIONS

"Photo Wash Water Recycling System Utilizes Ion Exchange Technology", Robert T. Kreiman, 1984.

*Primary Examiner*—Ivars Cintins
*Attorney, Agent, or Firm*—John R. Everett

[57] ABSTRACT

A method of treating photoprocessing wash water, comprising in sequence, the steps of:

A) contacting the wash water with an acrylic anion exchange resin to remove silver thiosulfate complex in the water; and B) contacting the water from step A) with an oxidizing agent that converts thiosulfate ions to sulfate ions.

C) recirculating continuously through the photoprocessing wash tank and steps A) and B).

7 Claims, 1 Drawing Sheet

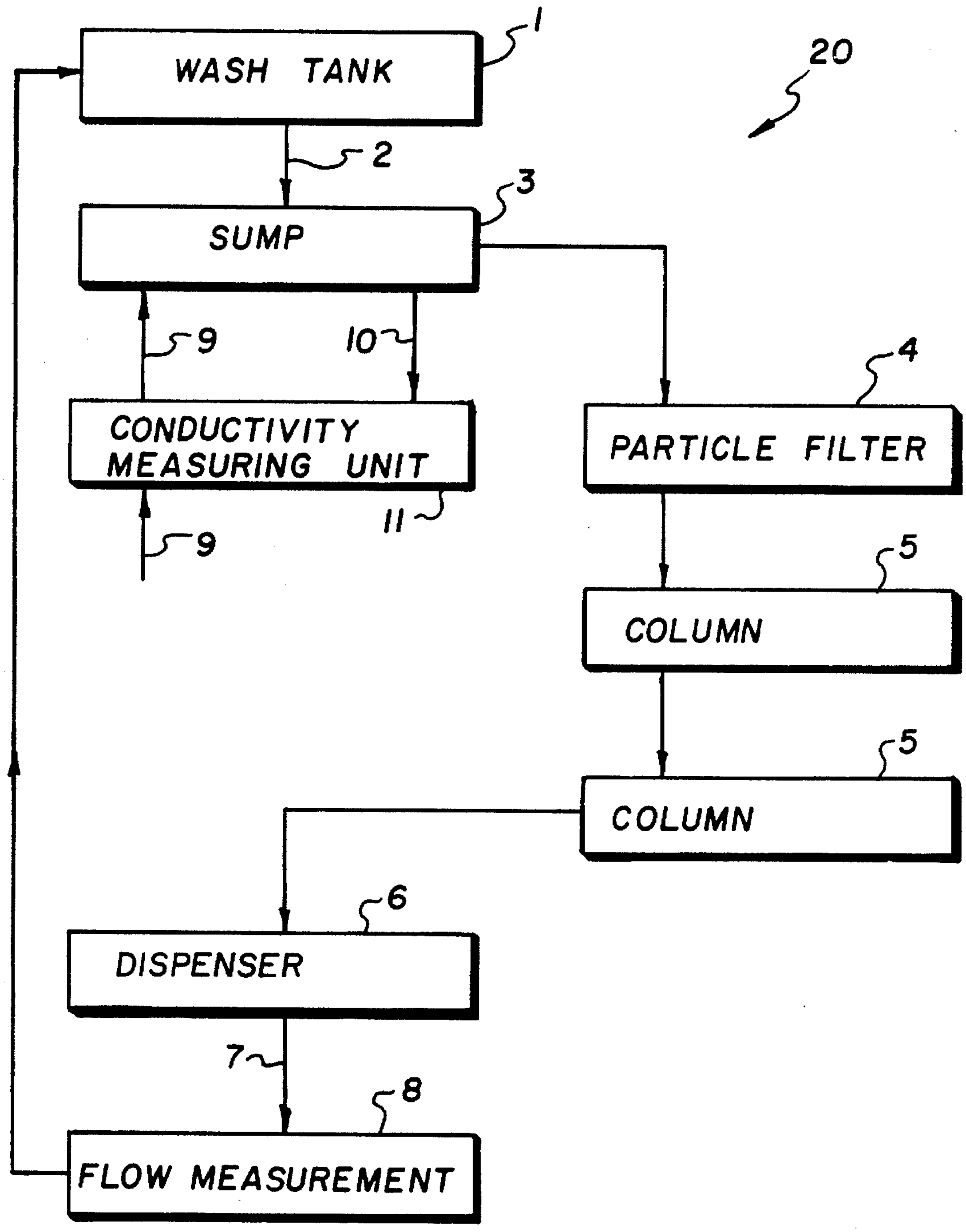
WASH TANK
1
20
2
SUMP
3
9
10
CONDUCTIVITY MEASURING UNIT
11
9
PARTICLE FILTER
4
COLUMN
5
COLUMN
5
DISPENSER
6
7
FLOW MEASUREMENT
8

PROCESS FOR RECYCLING PHOTOGRAPHIC WASH WATER

FIELD OF THE INVENTION

The present invention relates to photographic processing.

BACKGROUND

Typically non reversal photographic black and white film or paper photographic processors comprise four distinct sections:

developer;

fixer;

wash; and dryer.

The film or paper being processed first passes into the developer section where the latent image formed by light exposure is converted chemically to metallic silver. The film exits the developer and passes into the fixer section where the silver halide crystals that were not converted to metallic silver are dissolved out of the product, usually by a sodium or ammonium thiosulfate solution. The product then exits the fixer bath into a wash water bath where excess fixer is removed from the film or paper.

The amount of wash water required varies extensively among photographic processors. In the graphic arts segment, water requirements vary between 3.8 to 9.5 liters per minute (1.0 and 2.5 gallons). Until about ten years ago, a typical processor could use 1,500 to 4,500 liters of water per eight hours (400 to 1,200 gallons).

As water scarcity and cost increased, photographic processors installed water-saver solenoids to prevent fresh water from being used except when film or paper was actually being processed. These solenoids significantly reduced the amount of water consumed but it still is common for a processor to use as much as 950 to 1900 liters (250–500 gallons) of water per 8 hour per day.

Silver thiosulfate complex is carried out of the fixer bath in to the wash water by photographic films and papers during processing. Typical silver concentrations in single-use wash waters range from 3 to >10 mg/L (ppm). The used wash water is typically discharged to public or private sewers. Sewer codes have become increasingly strict over the past decade. It is not unusual to find sewer restrictions for silver between 1 and 5 mg/L in the U.S., Canada, and Western Europe. Land use restrictions for septic systems are even lower. Photoprocessors are slowly being restricted from discharging their used wash waters without prior treatment to remove silver. If the water must be hauled away from the photoprocessor for disposal, costs of $3 to $5 per gallon are typical.

Removal of silver thiosulfate ions using anion exchange resins from dilute aqueous solutions weakly basic is known in the art. However, as the concentration of thiosulfate increases, it impairs the effectiveness of such resins in removing silver thiosulfate ions from photographic wash water. At elevated concentrations the thiosulfate ions in solution displace silver thiosulfate ions from the resin. Other anions, such as halides, can have a similar effect.

BRIEF DESCRIPTION OF DRAWINGS

The FIGURE presents a means for carrying out the process of the invention.

SUMMARY OF THE INVENTION

The present invention provides a method of treating and recycling photoprocessing wash water, comprising in sequence, the steps of:

A) contacting the wash water with an acrylic anion exchange resin to remove silver thiosulfate complex in the water; and B) contacting the water from step A) with an oxidizing agent that converts thiosulfate ions to sulfate ions; and C) recirculating continuously through the photoprocessing wash tank and steps A)and B).

This process is effective in removing silver from the wash water and controls the level of thiosulfate ions during recycling of photographic wash water through steps A) and B). Moreover, the consumption of wash water can be reduced to a level of less than 10% of the volume used when water-saver solenoids are used. The quality (including keeping properties) of the processed film or paper is not adversely effected.

DETAILS OF THE INVENTION

The ability of the process of this invention to provide recycled photographic processor wash water resides in using a mild oxidizing agent to reduce the build up of thiosulfate ion in solution. Too much or too strong of an oxidant would cause undesired silver sulfide, damage the film or paper, or damage the resin. Small amounts of a strong oxidizing agent or increased amounts of a weaker oxidizing agent can be used. However a delicate equilibrium between oxidant and thiosulfate concentration must be maintained. The thiosulfate concentrations in the wash water should be controlled to a level of less than 5000 mg/L. Thiosulfate level can be monitored by measuring the conductivity of the recycled wash water. The conductivity must be maintained below 35,000 μS/cm.

Means for measuring conductivity are well known and are included in a unit for carrying out the process of the invention described below in connection with the FIGURE. The use of the combination of an anion exchange resin, of the type described hereafter, with an oxidizing agent that does not react with the anion exchange resin, such as halogenated dimethylhydantoins technology to accomplish the foregoing control of thiosulfate ions and the removal of silver thiosulfate ions is new in the art and the excellent performance is unexpected.

Exemplary means for carrying out the process of the invention are presented in the FIGURE. In the FIGURE there is shown a photographic wash water recycling unit 20 comprising tank 1 that receives film from a photographic fixer tank. Connected to tank 1 through line 2 is a sump 3 for holding overflow wash water from tank 1. Water from sump 3 is pumped, optionally, through a) a particle filter 4, b) first, and optionally second, columns 5 comprising weakly basic acrylic anion exchange resins and c) a dispenser 6 for releasing the oxidizing agent. After dispenser 6 the then treated wash water is recycled to wash water tank 1 through line 7 for reuse. The unit may include flow measurement means 8 for controlling the flow of treated water back into wash water tank 1. Additionally, the unit can include means for introducing fresh water into sump 3 through line 9, or alternately purge a portion of the recycled water. In the FIGURE the introduction of fresh water is controlled through conductivity measurements of water in the sump 3 using a conductivity probe 10 connected to in-line conductivity measuring unit 11. The conductivity probe can be located in other locations in the system.

The particle filter 4 is useful in removing solid buildup in the recycled wash water from such sources as solids coming from the film or paper during processing.

The anion exchange resin in column(s) 5 thoroughly removes silver-thiosulfate complexes in the wash water. Examples of useful resins include:

| Company | Resin | | | |
|---|---|---|---|---|
| Purolite | A850 | Acrylic | Gelular | Strong Base |
| Purolite | A870 | Acrylic | Gelular | Mixture: 70% Strong Base 30% Weak Base |
| Purolite | A845 | Acrylic | Gelular | Weak Base |
| Purolite | A860 | Acrylic | Macro-reticular | Weak Base |
| Sybron | Ionac A380 | Acrylic | Gelular | Weak Base |
| Sybron | Ionac A365 | Acrylic | Gelular | Strong Base |
| Rohm & Haas | IRA-68 | Amberlite ® | Gelular | Weak Base |
| Rohm & Hass | IRA-468 | Amberlite ® | | Strong Base |

A particularly useful anion exchange resin is a weak base tertiary amine on an acrylic backbone manufactured by Rohm and Haas sold as Amberlite® IRA-68.

The filtered and desilvered water emerging from column 5 still contains a concentration of thiosulfate ion. If the concentration is allowed to build up through repeated recycling, it would become detrimental to the weakly basic anion exchange resin. The large concentration of thiosulfate ion is also detrimental to the stability of sensitized products treated in the water. If the thiosulfate ion is not reduced sufficiently, the useful life of the processed sensitized products could be less than 6 months.

Dispenser 6 contains an oxidizing agent that converts thiosulfate ions to sulfate ions. Representative oxidizing agents include peroxides, persulfates, iodine and halogenated dimethylhydantoins such as 1-bromo-3-chloro-5,5-dimethylhydantoin. The latter halogenated dimethylhydantoin releases bromine and destroys thiosulfate by an oxidative mechanism according to the equation:

$$4Br_2+5H_2O+S_2O_3^{-2}\rightarrow 8Br^-+10H^++2SO_4^{-2}$$

Optimally, the selected oxidizing agent should be in a form that releases its oxidizing power slowly over time. For example PhotoBrome™ from Hydrotech Corporation, Marietta, Ga., is a halogenated dimethylhydantoin available in tablet form which releases bromine slowly as wash water passes over it.

Halogenated dimethylhydantoin offers the added advantage of also minimizing or eliminating biogrowth (such as algae) that grows in the wash water tanks and creates a major nuisance for photoprocessors. Halogenated dimethylhydantoin also unexpectedly provides extended life of the anion exchange resin. This is an additional, highly desirable benefit.

Means for carrying out the process of this invention can include means for removing organic materials that cause color or foaming. Such means can be included in the particle filter 4, the anion exchange columns 5, the dispenser for the oxidizing agent or in a separate column or container. Various organic species which may cause color or foaming, are removed by means such as catalyzed ultraviolet light, electrolysis, and activated charcoal. See WO 89/00985, U.S. Pat. No. 4,072,596, U.S. Pat. No. 5,035,784, U.S. Pat. No. 5,137,607, and U.S. Pat. No. 4,659,443. Activated charcoal eliminates both concerns. When used, the columns 5 can include the absorbent. For example column 5 may contain about 85% of the weakly basic anion exchange resin and 15% absorbent.

Once the wash water has passed through a particle filter, resin/charcoal cartridges, and the halogenated dimethylhydantoin dispenser, it is returned to the processor wash tank to be used again.

The above described process of this invention removes particulate particles, silver thiosulfate, color and foam generating chemicals from the wash water, and oxidizes thiosulfate ions. However, there is a build-up of other chemicals such as sulfate and bromide ions. Additionally, other chemicals are carried over into the wash water from the fixer tank. The continued build up of these species will ultimately have an adverse effect on photographic materials treated with the wash water. It is, therefore, desirable from time to time to remove a portion of the wash water and add fresh water to keep such chemicals within previously defined concentration limits.

The concentration of these ionic species is measured by means of two conductivity probes built into our unit. When conductivity exceeds a user-defined setpoint, water is purged out of the system with one final pass through the ion exchange resins to minimize the silver thiosulfate ion concentration in the water going to a sewer or other drain.

In actual use it would be better to periodically add small amounts of fresh water to the system as opposed to running a closed system until failure. Using the unit of the FIGURE, the process can be so operated. The user defines how much fresh water should be added to the system and at what time interval. As stated previously, conductivity of the recycled wash water can be used to define when and how much fresh water is to be added. This mode of operation might be used in a case where all discharged water must be hauled away regardless of silver content. Water use is significantly minimized.

During experiments with this process using the unit of the FIGURE, the only fresh water added to the system was that required to compensate for evaporative losses (<2 liters per day). The same water (approximately 32 liters [8 gallons]) was reused for 6 (8 hour) days. Without the process approximately 5700 liters (1,500 gallons) of fresh water would have been consumed in photographic film processing. All films processed during the 6 days had excellent sensitometric and physical quality. Fixer composition retained on processed film was less than 3 $\mu g/cm^2$, the ANSI limit for long term keeping for fine grain films.

The silver concentration in the recycled water during this period was maintained at less than 1 mg/L indicating that the IRA-68 resin columns did an excellent job of removing silver thiosulfate complexes, of which $[Ag(S_2O_3)_2^{-3}]$ is most common. Without use of the process of this invention, the silver and thiosulfate concentrations would be >300 mg/L and >7,500 mg/L, respectively. Both of these elevated values would be detrimental to processed film quality. Thiosulfate in films subjected to the process of the invention remained below 3 $\mu g/cm^2$, the ANSI standard for fine grain films to be termed "long term." In another experiment, thiosulfate concentrations were elevated in the absence of oxidizing agents such as halogenated dimethylhydantoin.

The invention has been described in detail with particular reference to preferred embodiments thereof, but it will be understood that variations and modifications can be effected within the spirit and scope of the invention.

We claim:

1. A method of treating and recycling photoprocessing wash water to maintain a conductivity below 35,000 μS/cm, comprising in sequence, the steps of:

A) contacting the wash water with an acrylic anion exchange resin to remove silver thiosulfate complex in the water; and B) contacting the water from step A) with an oxidizing agent that converts thiosulfate ions to sulfate ions; and C) recirculating the wash water continuously through the photoprocessing wash tank and steps A) and B).

2. The method of claim 1 wherein the anion exchange resin is selected from the group consisting of a quaternary amine on an acrylic backbone and a tertiary amine on an acrylic backbone.

3. The method of claim 2 wherein the anion exchange resin is a tertiary amine on an acrylic backbone.

4. The method of claim 1 wherein the oxidizing agent is selected from the group consisting of dimethylhydantoin, peroxides, persulfates, iodine and ozone.

5. The method of claim 4 wherein the oxidizing agent is 1-bromo-3-chloro-5, 5-dimethylhydantoin.

6. The method of claim 1 wherein the water is circulated through a particle filter before being contacted with the acrylic anion exchange resin in step A).

7. The method of claim 1 wherein activated charcoal to remove organic materials from photoprocessing wash water that cause color or foaming is (a) included in the acrylic anion exchange resin in step A; (b)mixed with the oxidizing agent in step B; or (c) is introduced into the wash water in a step other than step A and step B.

* * * * *